(12) United States Patent
Freiwald et al.

(10) Patent No.: US 9,021,284 B2
(45) Date of Patent: Apr. 28, 2015

(54) STANDBY OPERATION WITH ADDITIONAL MICRO-CONTROLLER

(75) Inventors: Axel Freiwald, Munich (DE); Bejoy Mathews, Vaterstetten (DE); Edward Wiley, Howell, MI (US)

(73) Assignee: Infineon Technologies AG, Neubiberg (DE)

( * ) Notice: Subject to any disclaimer, the term of this patent is extended or adjusted under 35 U.S.C. 154(b) by 708 days.

(21) Appl. No.: 13/227,843

(22) Filed: Sep. 8, 2011

(65) Prior Publication Data

US 2013/0067259 A1    Mar. 14, 2013

(51) Int. Cl.
*G06F 1/00* (2006.01)
*G06F 1/32* (2006.01)

(52) U.S. Cl.
CPC .............. *G06F 1/3293* (2013.01); *Y02B 60/32* (2013.01)

(58) Field of Classification Search
CPC ... G06F 1/3202; G06F 1/3289; G06F 1/3231; G06F 1/3228; G06F 1/26
USPC ........................... 713/300, 310, 320, 322, 323
See application file for complete search history.

(56) References Cited

U.S. PATENT DOCUMENTS

| | | | | |
|---|---|---|---|---|
| 7,636,863 | B2 * | 12/2009 | Oh | 713/320 |
| 2004/0003309 | A1 * | 1/2004 | Cai et al. | 713/320 |
| 2004/0225907 | A1 * | 11/2004 | Jain et al. | 713/320 |
| 2005/0114722 | A1 | 5/2005 | Tanaka et al. | |
| 2007/0079161 | A1 * | 4/2007 | Gupta | 713/324 |
| 2011/0018854 | A1 * | 1/2011 | Barclay et al. | 345/211 |
| 2011/0161682 | A1 * | 6/2011 | Wen et al. | 713/300 |
| 2011/0314314 | A1 * | 12/2011 | Sengupta | 713/323 |

OTHER PUBLICATIONS

Greenhalgh, Peter; "Big.LITTLE Processing with ARM Cortex A15 & Cortex—A7" ARM White Paper, Sep. 2011, p. 1-8.

* cited by examiner

*Primary Examiner* — Zahid Choudhury
(74) *Attorney, Agent, or Firm* — Eschweiler & Associates, LLC

(57) ABSTRACT

One embodiment of the present invention relates to a low-power micro-controller unit having both a standby micro-controller optimized for low power consumption and a main micro-controller optimized for high performance. A power supply is coupled to the main micro-controller and the standby micro-controller. The power supply provides power to one or more of the low-power, standby micro-controller and the high performance, main micro-controller by separate power supply paths, depending on system needs. The separate power supply paths allow the main micro-controller and the standby micro-controller operate independent of each other. During a low-power standby operating mode, power can be disconnected to the main micro-controller, while providing power to the standby micro-controller, thereby eliminating the leakage current associated with the large number of transistors in the main micro-controller, while still retaining the computational capabilities of the standby micro-controller.

15 Claims, 6 Drawing Sheets

STANDBY OPERATION WITH ADDITIONAL MICRO-CONTROLLER

BACKGROUND OF THE INVENTION

The standby power consumption of integrated chips used in control systems is an important consideration for systems that operate in a low power standby mode. However, as the size of transistors used in integrated chips continues to shrink, leakage currents increase and drive up standby power consumption. In the latest high performance micro-controllers, designed in technology nodes of 90 nm and below, the standby power consumption of a transistor device is dominated by leakage currents, especially at higher temperatures.

Leakage current is the current that flows between the source and the drain of a transistor device when the gate of the transistor is turned off. Typically, when the gate of a transistor is turned off a negligible amount of leakage current flows between the source and drain terminals. However, in state of the art integrated chips the minimum allowable gate length, and therefore the physical distance between source and drain, has shrunk to such a small size that even when a transistor is turned off the leakage current causes a micro-controller to still draw a significant amount of power.

Circuitries and techniques that have been implemented to address the issue of leakage current are increasingly complicated. For example, one prior art technique eliminates leakage current during standby operation by turning off power to a micro-controller using a periodic sleep-wake-up mechanism, which switches off a micro-controller and wakes it up periodically. The average energy/current consumption of such a micro-controller is calculated based upon the power consumption of the sleep-wake-up logic, plus the power consumed to switch on/off the micro, plus the power consumption during operation. Despite such efforts, the average energy consumption does not meet the stringent requirements of low power micro-controllers.

DETAILED DESCRIPTION OF THE INVENTION

Figure 1:
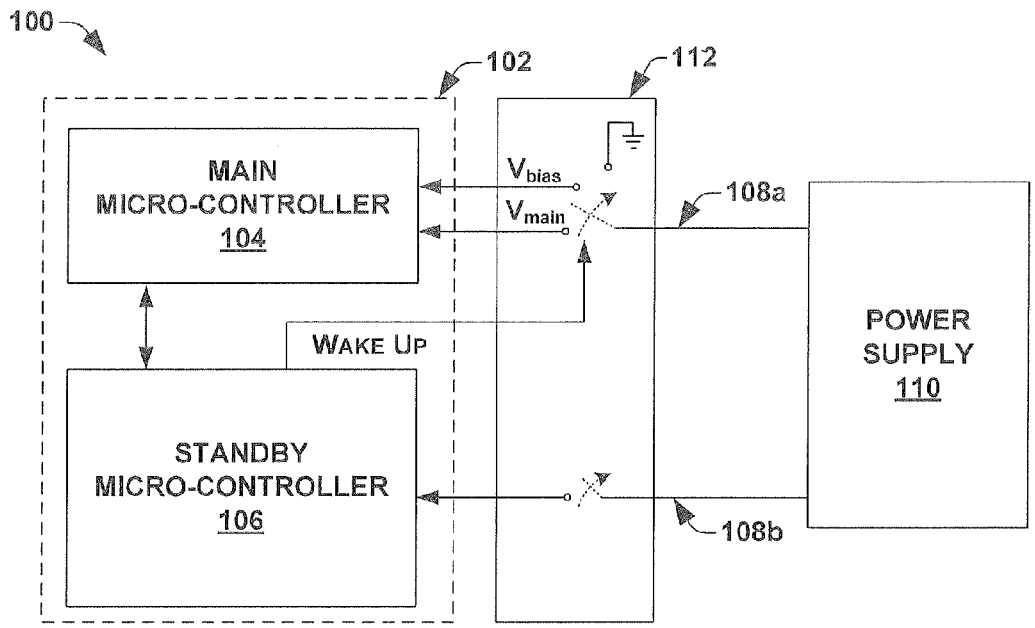
FIG. 1 illustrates a block diagram of a first embodiment of a micro-controller unit.

The present invention will now be described with reference to the attached drawing figures, wherein like reference numerals are used to refer to like elements throughout, and wherein the illustrated structures and devices are not necessarily drawn to scale.

Some aspects of the present disclosure provide for a micro-controller unit. The micro-controller unit comprises both a main micro-controller and a standby micro-controller. A power supply is coupled to the main micro-controller and the standby micro-controller by separate power supply paths that allow the main micro-controller and the standby micro-controller operate independent of each other. During a low-power standby operating mode, the power supply operates the main micro-controller in a reduced leakage state (e.g., turns off the power) while the power supply operates the standby micro-controller in a standard operating state (e.g., turns the power on), thereby reducing the leakage current associated with the large number of transistors in the main micro-controller while retaining the computational capabilities (i.e., the processing capabilities) of the standby micro-controller. The power supply is further configured to resume a normal operating mode (e.g., by selectively providing power to the main micro-controller) based upon a wake-up command generated by the standby micro-controller.

It will be appreciated that as provided herein, the term "reduced leakage state" refers to a variety of micro-controller operating states that reduce the leakage current of transistor devices within the main micro-controller while negatively impacting the computational capabilities of the main micro-controller. For example, in one embodiment, a "reduced leakage state" may be achieved by providing no voltage to the main micro-controller. In an alternative embodiment, a "reduced leakage state" may be achieved by reducing the voltage that is provided to the main micro-controller.

In yet another embodiment, the main micro-controller may be operated in a "reduced leakage state" by utilizing well biasing techniques to reduce the leakage current. As one of ordinary skill in the art will appreciate, well biasing techniques apply bias voltages to the wells of semiconductor devices to reduce leakage currents of the semiconductor devices. When well biasing is applied, the main micro-controller cannot be operated for processing purposes, but the content of volatile memories within the main micro-controller (e.g., SRAMs, registers) can be maintained. It will be appreciated that the above embodiments are non-limiting and that the disclosed methods and apparatus may employ any technique that reduces the leakage current of a micro-controller FIG. 1 illustrates a block diagram of a first embodiment of a micro-controller unit 100. The disclosed micro-controller unit 100 allows for both high performance and low power operation while mitigating the negative effects of leakage current.

Referring to FIG. 1, the micro-controller unit 100 comprises a main micro-controller 104 and a standby micro-controller 106. The main micro-controller 104 and the standby micro-controller 106 are selectively coupled to a power supply 110 that is configured to supply power to respective micro-controllers. As shown in FIG. 1, the main micro-controller and the standby micro-controller are coupled to the power supply 110 by way of separate power supply paths, a first power supply path 108a and a second power supply path 108b. The separate power supply paths allow the main micro-controller 104 and the standby micro-controller 106 to operate independent of one another, so that the main micro-controller 104 can be operated in a reduced leakage state (having impaired performance capabilities) while the standby micro-controller remains in a standard operating state (having full performance capabilities).

The use of separate power supply paths allows for both high performance and low power operating modes. For example, micro-controller unit 100 is configured to operate in a high performance normal operating mode (e.g., during full operation of the controlled system) and in a low power standby operation mode (e.g., during standby operation of the controlled system). During the normal operating mode, the power supply 110 operates in a first power configuration in which power is provided from the power supply 110 to the main micro-controller 104 to operate the main micro-controller in a standard operating state. During the standby operating mode, the power supply 110 operates in a second power configuration in which power is provided from the power supply 110 to the standby micro-controller 106 and the main micro-controller is driven into a reduced leakage state. By operating the main micro-controller 104 in a reduced leakage state, operative currents and leakage currents of the large number of transistors within the main micro-controller 104 are reduced.

In one embodiment, the second power configuration may achieve the reduced leakage state by operating the power supply to perform well biasing (e.g., illustrated as connecting the power supply 110 to $V_{bias}$). In alternative embodiment, the second power configuration may achieve the reduced leakage state by not connecting the power supply to the main micro-controller 104 (e.g., illustrated as connecting the power supply 110 to ground) or by reducing the voltage value provided to the main micro-controller (e.g., illustrated as reducing the voltage value provided from the power supply 110 to $V_{main}$).

The standby micro-controller 106 is configured to output a wake-up signal WAKE-UP that controls the connection of the power supply 110 to the main micro-controller 104. In one embodiment, upon detection of a predetermined event, the standby micro-controller 106 is configured to output a wake-up signal which causes the power supply 110 to change operation of the main micro-controller 104 from a reduced leakage state to a standard operating state. The predetermined event may include, but is not limited to the reception of data that cannot be sufficiently processed by the limited processing capabilities of the standby micro-controller, loss of power, emergency situations, reception of a task specifically assigned to the main micro-controller, etc. For example, when the standby micro-controller 106 is operating in a low-power standby operating mode and receives a command that requires a higher processing performance, the standby micro-controller 106 may send a wake-up signal that causes the power supply 110 to end operation of the main micro-controller 104 in the reduced leakage state, thereby waking up the main micro-controller 104 and allowing the micro-controller unit 100 to perform high processing performance.

In one embodiment, the power supply 110 is selectively coupled to the main micro-controller 104 and the standby micro-controller 106 by way of a power regulation apparatus 112 configured to receive the wake-up signal and to control power flow to the main micro-controller 104. The power regulation apparatus 112 may comprise a simple switch, in one embodiment. In alternative embodiments, the power regulation apparatus 112 may comprise a wide range of devices that control the application of voltage to the main micro-controller 104. In one embodiment the power regulation apparatus 112 may be comprised within the power supply 110. In another embodiment, the power regulation apparatus 112 may be separate from the power supply 110. For example, the power regulation apparatus may be comprised within an integrated chip package 102 containing the main micro-controller 104 and the standby micro-controller 106. In one embodiment, the power regulation apparatus 112 may comprise a first power regulator circuit configured to regulate power to a main micro-controller 104 and a second power regulator circuit configured to regulate power to a standby micro-controller 106.

It will be appreciated that the inherent processing capabilities and power consumption of standby micro-controller may be chosen to meet the needs of a system. For example, in one embodiment (e.g., associated with multi-core processors), a micro-controller unit 100 comprises a main micro-controller 104 configured to operate at a first power consumption and to process data at a first processing speed and a standby micro-controller 106 configured to operate at a second power consumption substantially equal to the first power consumption and to process data at a second processing speed substantially equal to the first processing speed.

In another embodiment, a lower standby operating mode power consumption may be achieved by having a micro-controller unit 100 comprising a high performance main micro-controller 104 and a low power standby micro-controller 106 optimized for low-power consumption. In such an embodiment, the main micro-controller 104 is configured to operate at a first power consumption and to process data at a first processing speed and the standby micro-controller 106 is configured to operate at a second power consumption smaller than the first power consumption and to process data at a second processing speed slower than the first processing speed.

In such an embodiment the "low-power, standby micro-controller" refers to a micro-controller that is optimized for low power operation relative to the main micro-controller. In one embodiment, optimization of the standby micro-controller for low power operation may comprise having a standby micro-controller with a smaller number of transistors than the main micro-controller. For example, the main micro-controller may comprise a first number of transistors (e.g., tens of millions of transistors) while the standby micro-controller may comprise a second number of transistors smaller than the first number of transistors (e.g., tens of thousands of transistors). The smaller number of transistors in the standby micro-controller provides for a reduced processing power that is sufficient to run the micro-controller unit and awaken the main micro-controller when a greater processing power is needed. The smaller number of transistors also provides for a lower power consumption (e.g., a standby average current consumption less than 100 μA) than that used by the high performance main micro-controller (e.g., having a power consumption of 100 mA-1000 mA).

Figure 2:
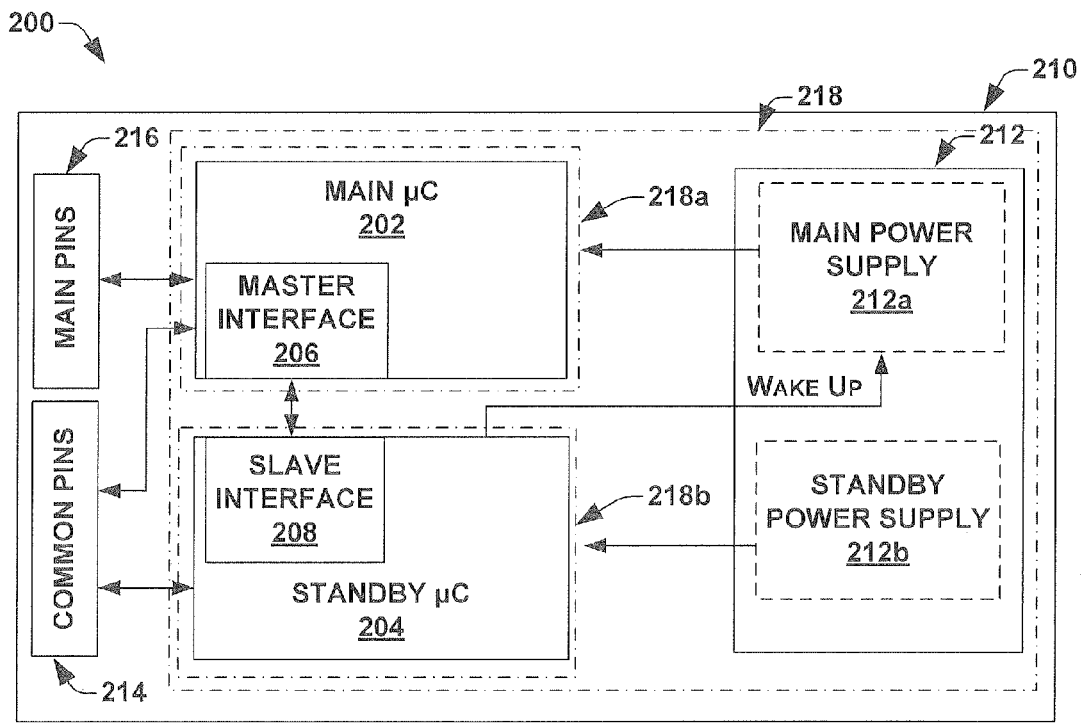
FIG. 2 illustrates a block diagram of a more detailed embodiment of a micro-controller unit.

FIG. 2 illustrates a block diagram of a more detailed embodiment of a micro-controller unit 200, as provided herein.

As shown in FIG. 2, the main micro-controller 202 and the standby micro-controller 204 are connected via a communication interface over which commands, data, and/or code may be sent. In one embodiment, the communication interface allows for the main and standby micro-controllers to operate according to a master-slave relationship. In such an embodiment, illustrated in FIG. 2, the communication interface comprises a master interface 206 and a slave interface 208 for internal communication within the micro-controller unit 200.

In one embodiment, the communication interface can be established in a way that the master interface 206 is configured to send commands (e.g., data, code) to the slave interface 208. For example, the main micro-controller 202 may use the master interface 206 to send code and/or data to the slave interface 208 during a normal operating mode, which define operation of the standby micro-controller 204 (e.g., in the normal operating mode and/or in a subsequent standby operating mode).

In various embodiments, the main micro-controller 202 and standby micro-controller 204 may be coupled to separate input/output (I/O) pins or share common I/O pins 214 of a same integrated chip (IC) package 210. The I/O pins are configured to allow the micro-controller unit 200 to read external signals (e.g., from sensors) or to provide signals that drive external devices (e.g., LEDs). In one embodiment, a main micro-controller 202 and the standby micro-controller 204 are configured to share a bundle of common I/O pins 214 (e.g., 30-40 I/O pins), while the main micro-controller 202 utilizes additional main I/O pins 216.

For example, during a normal operating mode the main I/O pins 216 are activated and used by the main micro-controller 202 and the common I/O pins 214 are activated and used by either the main micro-controller 202 and/or the standby micro-controller 204. During a low-power standby operating mode, the main I/O pins 216 are turned off to reduce power consumption, while the common I/O pins 214 remain active so that the standby micro-controller 204 can continue to receive data from a controlled system. Thus, sharing common I/O pins 214 between the main micro-controller and standby micro-controller allows the standby micro-controller 204 to operate independent of the main micro-controller 202 so that when the main micro-controller 202 is operated in a reduced leakage state (e.g., when power to the main micro-controller is turned off) during a standby operating mode, the standby micro-controller 204 may continue to interface with the controlled system.

In one embodiment, the power supply 212 may comprise a single power source (e.g., a car battery stepped down to an appropriate lower voltage). In an alternative embodiment, the power supply 212 may comprise a main power supply 212a for the main micro-controller 202 and separate standby power supply 212b for the standby micro-controller 204.

In one embodiment, one or more of the main micro-controller 202, the standby micro-controller 204, and/or the power supply 212 may be comprised within a single integrated chip (IC) package 210. In one embodiment, one or more of the main micro-controller 202, the standby micro-controller 204, and/or the power supply 212 may be comprised on a same silicon substrate 218 within the IC package 210. For example, the main micro-controller 202 and the standby micro-controller 204 may be comprised on a same silicon substrate 218 within the IC package 210 or the main micro-controller 202 may be disposed on a first silicon substrate 218a while the standby micro-controller 204 may be disposed on a separate second silicon substrate 218b within the IC package 210.

Figure 3A:
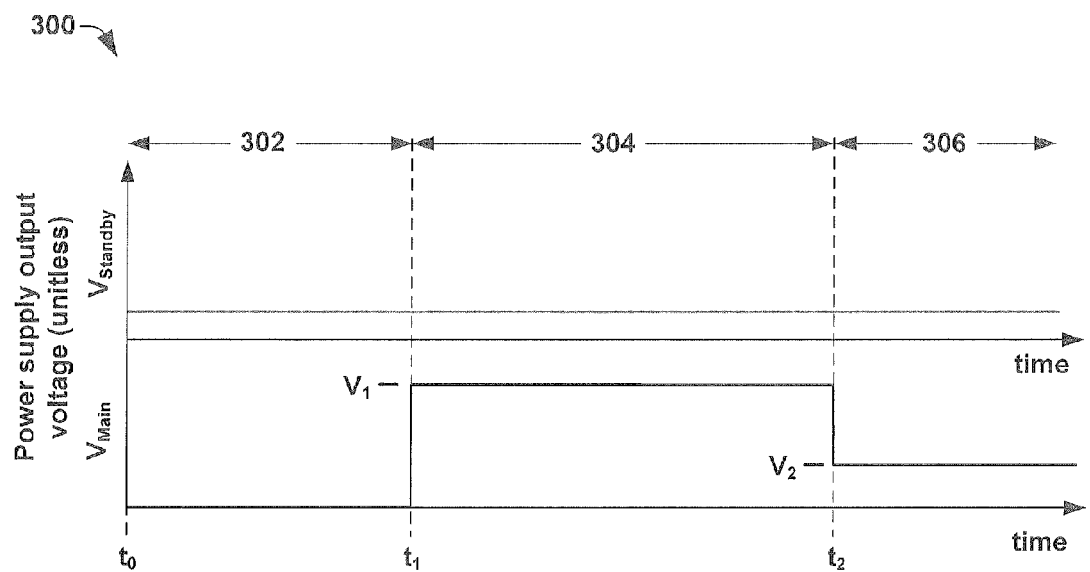
FIGS. 3a-3b are graphs showing the power signal provided to a main micro-controller and a standby micro-controller of the micro-controller unit provided herein.
Figure 3B:
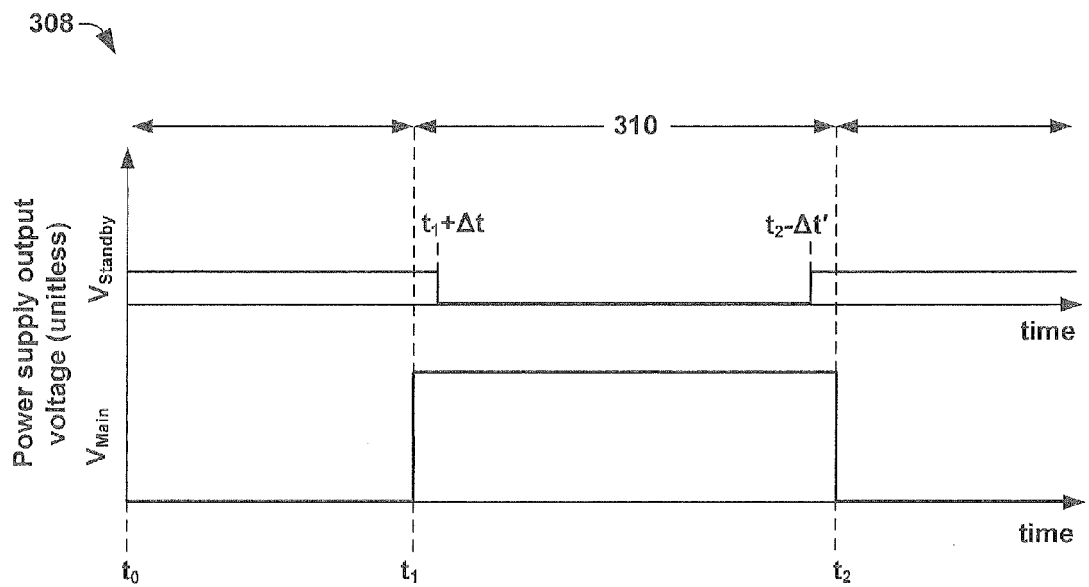

FIGS. 3a and 3b illustrate graphs corresponding to an embodiment wherein a "reduced leakage state" is achieved for a main micro-controller (e.g., corresponding to main micro-controller 104) by turning off the voltage to the main micro-controller and by reducing the voltage that is provided to the main micro-controller.

More particularly, FIGS. 3a and 3b are graphs showing a voltage output from a power supply (e.g., corresponding to power supply 110) to each of a main micro-controller and a standby micro-controller comprised within a micro-controller unit as a function, as provided herein. In particular, the graphs 300 and 308 illustrate a unit-less voltage value along the y-axis and time along the x-axis.

Referring to FIG. 3a, between time $t_0$ and $t_1$ the micro-controller unit is in a first power configuration 302 associated with a low-power standby operating mode. In the first power configuration 302, a voltage ($V_{standby}$) is provided from the power supply to the standby micro-controller that allows the standby micro-controller to operate in a standard operating state. In the first power configuration 302, a voltage ($V_{Main}$) having a value of zero (i.e., no power) is provided from the voltage supply to the main micro-controller, thereby turning off the main micro-controller and eliminating leakage currents in transistors comprised within the main micro-controller. Therefore, in the first power configuration 302 processing for the micro-controller unit is performed by the standby micro-controller.

It will be appreciated that since the standby micro-controller has a non-zero processing power, the first power configuration may encompass operation of the micro-controller unit during a wide range of applications. For example, the micro-controller unit may remain in the first power configuration during relatively simple tasks that do not use the high performance processing capabilities provided by the main micro-controller. It will be appreciated that the relative simplicity of these tasks depends upon the processing capabilities of the standby micro-controller. For example, a standby micro-controller having more transistors will be able to perform more complicated tasks, but will also consume more power.

At time $t_1$, the standby micro-controller turns on the main micro-controller by sending a wake-up signal that enables a non-zero voltage to be sent from the power supply to the main micro-controller.

Between time $t_1$ and $t_2$ the micro-controller unit is in a second power configuration 304 associated with a normal operating mode. In the second power configuration 304, a voltage ($V_{Main}$) having a value of $V_1$ is provided from the voltage supply to the main micro-controller, thereby turning on the main micro-controller. As shown in FIG. 3a, in the second power configuration 304 the standby micro-controller may remain on, acting as a companion to main micro-controller, so that both the main micro-controller and the standby micro-controller are operational (e.g., to perform processing of data).

Furthermore, between time $t_1$ and $t_2$ the main micro-controller may communicate (e.g., read, write) commands, data, and/or code to/from the standby micro-controller. Reading data from the standby micro-controller allows the main micro-controller to gain information stored in the standby micro-controller during a standby operating mode (e.g., from time $t_0$ to $t_1$). Writing data from the standby micro-controller allows the main micro-controller to provide new code and/or data to the standby micro-controller to control its operation during a normal operating mode (e.g., from time $t_1$ to time $t_2$) and/or to control its operation during a subsequent low-power standby operating mode (e.g., from time $t_2$ onward).

At time $t_2$, the micro-controller unit enters a third power configuration 306 associated with a low-power standby operating mode. In the third power configuration 306, a reduced voltage ($V_{Main}$) having a value of $V_2$ (where $V_2 < V_1$) is provided from the voltage supply to the main micro-controller. The reduced voltage value exponentially reduces the leakage current of the main micro-controller. For example, a reduction in the voltage by a factor of 2 will reduce the leakage current by more than a factor of 4. In one embodiment, the voltage $V_2$ may be chosen to have a value that is sufficient to maintain content in volatile memories in the main micro-controller. During the low-power standby operating mode associated with the third power configuration 306, the standby micro-controller will operate according to code written to it by the main micro-controller (e.g., at a time before $t_2$, such as from time $t_1$ to time $t_2$).

Therefore, depending on the power configuration, the standby micro-controller may operate as a master (e.g., at time $t_1$), as a slave (e.g., from time $t_2$), or as a companion (e.g., between time $t_1$-$t_2$) to the main micro-controller.

It will be appreciated that the separate power supply paths of the main micro-controller and the standby micro-controller allow for a variety of different power configurations. For example, FIG. 3b illustrates a graph 308 showing an addition power configuration 310, wherein the standby micro-controller is configured to turn off when power is provided to the main micro-controller.

In one embodiment, there may be an overlap in time during which both the main micro-controller and the standby micro-controller are powered so that the main micro-controller is able to read and/or write data and/or code to the standby micro-controller. For example, after the main micro-controller receives a voltage at time $t_1$, the standby micro-controller may continue to receive a voltage from the power supply until time $t_1 + \Delta t$. During this overlap in time $\Delta t$ the main micro-controller may read data from the standby micro-controller. Similarly, the standby micro-controller may receive a voltage at time $t_2 - \Delta t'$, prior to the main micro-controller being turned off at time $t_2$. During this overlap in time $\Delta t'$ the main micro-controller may communicate commands, code, and/or data to the standby micro-controller.

It will be appreciated that the micro-controller unit provided herein may be operated according to any of the above power configurations described in relation to FIG. 3a or 3b or any combination thereof. Furthermore, the graphs shown in FIGS. 3a and 3b are non-limiting and that in alternative embodiments, additional methods may be used to reduce the leakage current (e.g., by well biasing) either separately or in conjunction with the illustrated voltage reduction techniques.

In various embodiments, the micro-controller unit may be comprised within an embedded system including hardware and mechanical parts. In such an embodiment, the micro-controller unit may be configured to perform one or more dedicated functions within the embedded system (e.g., to automatically control a device).

Figure 4:
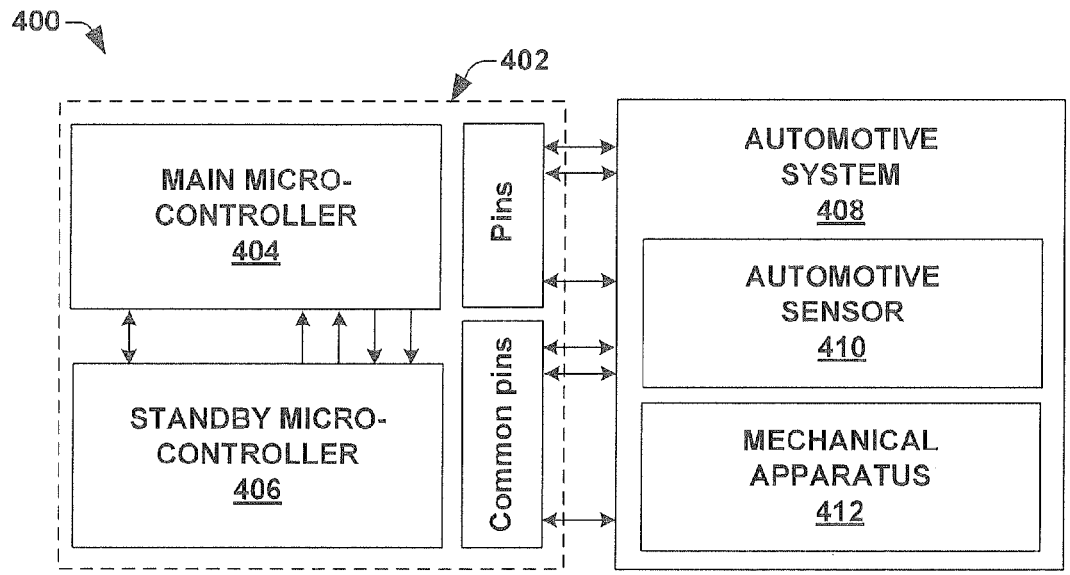
FIG. 4 illustrates a block diagram of an embedded system comprising a micro-controller unit.

In one particular embodiment, illustrated in the block diagram of FIG. 4, the micro-controller unit 400 may be embedded into an automotive system (e.g., to control automobile engine control systems). As shown in FIG. 4, the IC package 402 of the micro-controller unit is coupled to an automotive system 408 comprising automotive sensors 410 and mechanical apparatus 412. The micro-controller unit 400 is configured to provide real time response to events in the automotive system 408 it is controlling. For example, the automotive sensors 410 may detect a condition of the automobile (e.g., pressure, temperature, if a button has been pressed, etc.) that is communicated to the micro-controller unit, while the mechanical apparatus 412 is configured to receive a control signal from the micro-controller unit to take a mechanical action.

The micro-controller unit 400 may operate in a standby operating mode while the automobile is stopped or turned off (e.g., while the automobile is parked) and may operate in a normal operating mode when the automobile is driving or turned on (e.g., the automobile is being driven). In one embodiment, during a standby operating mode the standby micro-controller 406 may continue to perform some non-computationally intensive functionality of the automobile. For example, an air-conditioning unit a mechanical apparatus 412 comprising a blower may run for a short time after the engine of the automobile is turned off, to prevent damage to the air conditioner's condenser. To keep the blower running without using a large amount of power, the standby micro-controller 406 may perform a computationally simple temperature monitoring of the condenser and keep the blower running until the temperature is in a range to turn off the blower.

Operation of the standby micro-controller 406 during a standby operating mode also enables the micro-controller unit 400 to provide fast responses to detected conditions of the automobile. For example, since the standby micro-controller 406 is operational during a standby operating mode it may immediately respond to an external request rather than having to wait for the main micro-controller 404 to be awakened and to boot. This is in contrast to a periodically sleep-wake-up mechanism, which boots the main micro-controller before performing any sort of computation.

Figure 5:
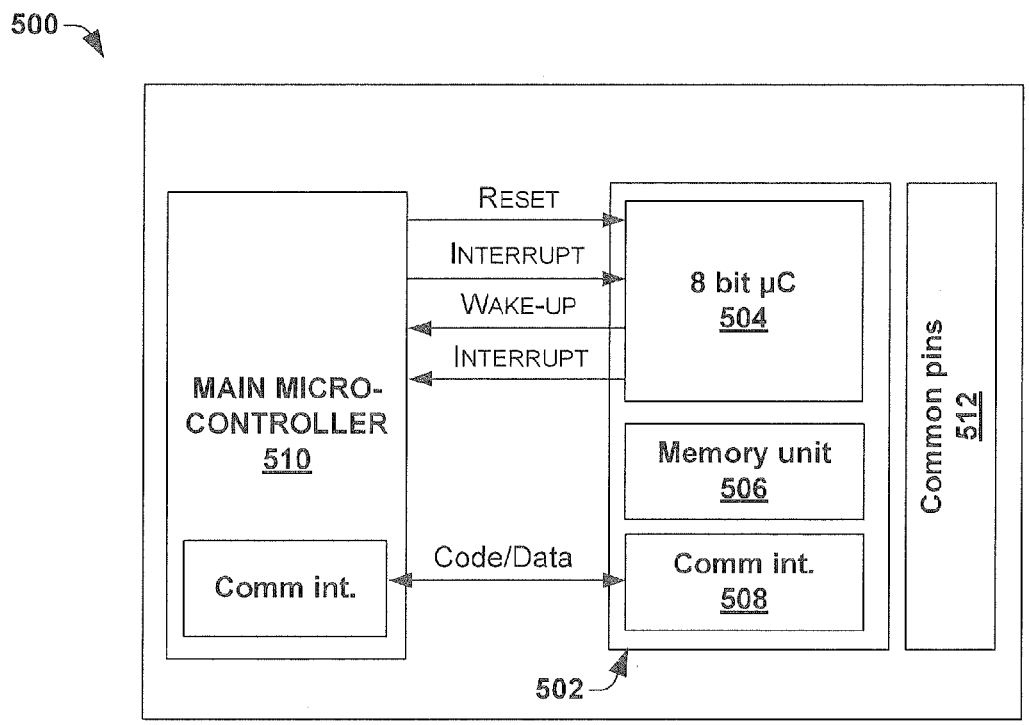
FIG. 5 illustrates a block diagram of a more detailed embodiment of a standby micro-controller comprised within a micro-controller unit, specifically illustrating communications between the main micro-controller and the standby micro-controller.

FIG. 5 illustrates a block diagram of a more detailed embodiment of a standby micro-controller 502 comprised within a micro-controller unit 500, specifically illustrating communications between the main micro-controller 510 and the standby micro-controller 502. As shown in FIG. 5, the standby micro-controller 502 comprises a micro-controller 504 and a memory unit 506 coupled, to a communication interface 508 in direct communication with a main micro-controller 510. In one embodiment the memory unit 506 may be comprised within the micro-controller 504.

In one embodiment, the main micro-controller 510 comprises a multi core Tricore system and the standby micro-controller 502 comprises an 8-bit micro-controller. In one embodiment, the 8-bit micro-controller may comprise a type 8051 micro-controller, for example. In alternative embodiments, the micro-controller 504 may comprise other size micro-controllers such as 16-bit micro-controllers, 32-bit micro-controllers, etc.

In one embodiment, the memory unit 506 may comprise an SRAM memory array containing a small amount of memory. For example, the SRAM memory array may contain between 8 k (8192 bytes) and 16 k (16384 bytes). Data and/or code may be written to and from the SRAM by the main micro-controller 510, as described below. Since SRAM is a volatile memory, if the standby micro-controller is powered down during normal operating mode, power must be provided to the standby micro-controller for a sufficient time to allow the main micro-controller 510 to read and write the content of the SRAM memory.

In another embodiment, the memory unit 506 may comprise a non-volatile memory, such as a ROM memory, for example. The ROM memory may comprise several different options of ROM code, which can be selectively chosen by commands received from the main micro-controller. For example, the commands may select a ROM code based upon operating conditions of the controlled system.

In one embodiment, the memory unit 506 also contains error correction code (ECC) protection. The ECC protection allows for errors in the memory unit 506 to be detected and communicated to the main micro-controller 510. If an error is present that renders the standby micro-controller 502 unreliable, the main micro-controller 510 may chose not to utilize the standby micro-controller 502 for processing (e.g., to not enter standby operating mode) or to reload the content of the memory unit 506 (e.g., the SRAM memory).

The communication interface 508 between the main micro-controller 510 and the standby micro-controller 502 allows the standby micro-controller 502 to operate as a slave of main micro-controller. For example, commands, code, and/or data controlling operation of the standby micro-controller may be downloaded from the main micro-controller 510 into the SRAM 506 of the standby micro-controller via the communication interface 508. In one embodiment, the commands or code control operation of the standby micro-controller 502 during a standby operating mode, so that even while the main micro-controller 510 is not operational the standby micro-controller 502 operates according to commands or code issued by the main micro-controller 510. In one embodiment, the main micro-controller 510 also hands over control of common I/O pins 512 to the standby micro-controller 502 during the standby operating mode so that the standby micro-controller 502 can interface with an external controlled system while the main micro-controller 510 is sleeping.

The communication interface 508 also allows the main micro-controller to fully control the actions of the standby micro-controller during a normal operating mode. In one embodiment, the master main micro-controller 510 can keep the slave standby micro-controller 502 operating on certain tasks during the normal operating mode to increase overall processing capabilities of the micro-controller unit 500. In such an embodiment, the main micro-controller 510 may have the common I/O pins 512 transmit data to either the standby micro-controller 502 or the main micro-controller 510.

The 8-bit micro-controller 504 is configured to exchange additional signals with the main micro-controller 510. In particular, the 8-bit micro-controller is configured to receive INTERRUPT and RESET signals from the main micro-controller. The INTERRUPT signal indicates to the 8-bit micro-controller 502 that a processing is to be performed (e.g., that a button has been pushed in a car that requires a reaction by the 8-bit micro-controller). It will be appreciated that although the additional signals are shown in FIG. 5 as going directly between the 8-bit micro-controller and the main micro-controller, that the additional signals may be communicated between the main micro-controller 510 and the 8-bit micro-controller via the communication interface.

The RESET signal stops operation of the 8-bit micro-controller 504. For example, when the main micro-controller 510 decides that the 8-bit micro-controller 504 will change its operation it will download a different code to the SRAM 506. To download the different code, the main micro-controller 510 will send a RESET signal that stops operation of the 8-bit micro-controller 504. The main micro-controller 510 then exchanges the content of the SRAM memory 506 by way of code and/or data sent through the communication interface 508. The RESET signal may be held (e.g., held at a high value) until there is well defined content in the SRAM 506. Then the 8-bit micro-controller is turned "on" again by releasing the RESET signal (e.g., setting the RESET signal to a low value).

It will be appreciated that the main micro-controller 510 may write data to the memory unit 506 of the standby micro-controller without using the RESET signal. However, the main micro-controller 510 cannot write data to specific memory addresses of the memory unit 506 when the 8-bit micro-controller 504 is using the memory addresses for executing code. Therefore, the RESET signal allows the main micro-controller 510 to interrupt operation of the 8-bit micro-controller 504 and to write code to memory unit locations that are used to store code that is being current used by the 8-bit micro-controller 504.

During operation, the 8-bit micro-controller 504 is also configured to send INTERRUPT and WAKE-UP signals to the main micro-controller 510. The INTERRUPT signal interrupts operation of the main micro-controller 510 and indicates to the main micro-controller 510 that a process is to be performed. The WAKE-UP signal wakes up the main micro-controller 510 from a standby operating mode by causing power to be provided from a power supply to the main micro-controller 510.

Figure 6:
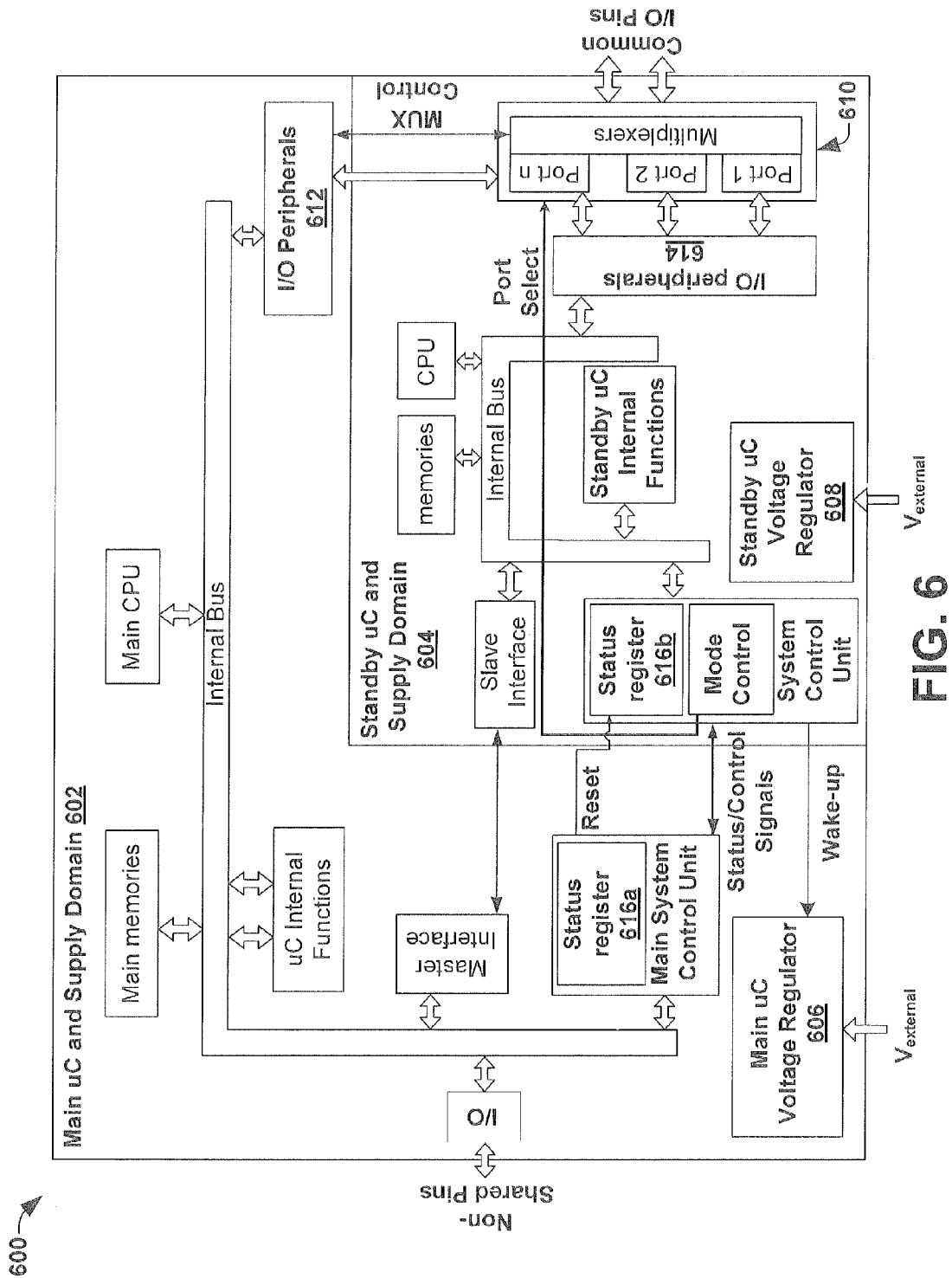
FIG. 6 illustrates a block diagram of the micro-controller unit provided herein.

FIG. 6 illustrates a block diagram of a specific diagram of the micro-controller unit 600 provided herein.

As illustrated in FIG. 6, each of the main micro-controller 602 and the standby micro-controller 604 comprise voltage regulators configured to regulate the voltages received from an external power supply into the main micro-controller and the standby micro-controller. A main micro-controller voltage regulator 606 regulates voltages within a main voltage supply domain by selectively providing a voltage to the main micro-controller or by selectively providing bias voltages to transistor device wells within the main micro-controller. A standby micro-controller voltage regulator 608 regulates voltages within a standby voltage supply domain by selectively providing power to the standby micro-controller (i.e., toggling power on and off).

A multiplexer unit 610 comprising one or more multiplexers is located at the output of the standby micro-controller 604. The multiplexer unit 610 further comprises a plurality of ports in communication with I/O peripherals 614. As shown in FIG. 6, the main micro-controller communicates a MUX Control command to the multiplexer unit 610, via an I/O peripheral 612, to control operation of the common I/O pins (i.e., which micro-controller operates on the common I/O pins). Based upon this command, the multiplexer unit 610 will either input/output information to/from the standby micro-controller via I/O peripherals 614 or deny access by the standby micro-controller and input/output information to/from the main micro-controller via I/O peripherals 612. As shown in FIG. 6, the multiplexer unit 610 is in the power domain of the standby micro-controller, but is controlled by the main micro-controller to define which micro-controller is operating on the common I/O pins. While the power of the main micro-controller is off the common I/O pin assignment is kept the same.

In one embodiment, status bits may be used to share data between the main micro-controller 602 and the standby micro-controller 604. The status bits may be stored in a status register 616 as register bits. The status register may comprise a physical register or be a part of the memory unit (e.g., part of an SRAM). In various embodiments the status register 616 may be stored partly in the main voltage supply domain (as status register 616a) and partly in standby voltage supply domain (as status register 616b). For example, the main voltage supply domain may comprise status registers containing status bits from which the standby micro-controller is reset. Similarly, the standby voltage supply domain may comprise status registers containing status bits relating to the state of the standby micro-controller. For example, if non-correctable error is present in the memory of the standby micro-controller, status bits may be used to convey to the main micro-controller that the standby micro-controller is no longer operable.

In one embodiment, status bits may be indicative of the event that caused the standby micro-controller to send a wake-up signal to wake-up the main micro-controller from a standby operating mode (e.g., an error situation, a power loss, a task specifically assigned to the main-microcontroller, etc.), and may be read by the main micro-controller to determine the event and accordingly how the main micro-controller is to power up. For example, if the standby micro-controller experiences a power loss while in a standby operating mode, it will wake-up the main micro-controller when power is available. The main micro-controller may take different actions in response to different status bits. For example, a main micro-controller's response to a wake-up due to power loss may be different than if the wake-up is due to an error situation. Therefore, when the main micro-controller realizes a wake-up from a standby operating mode, it will start booting according to the information from the status bits.

Figure 7:
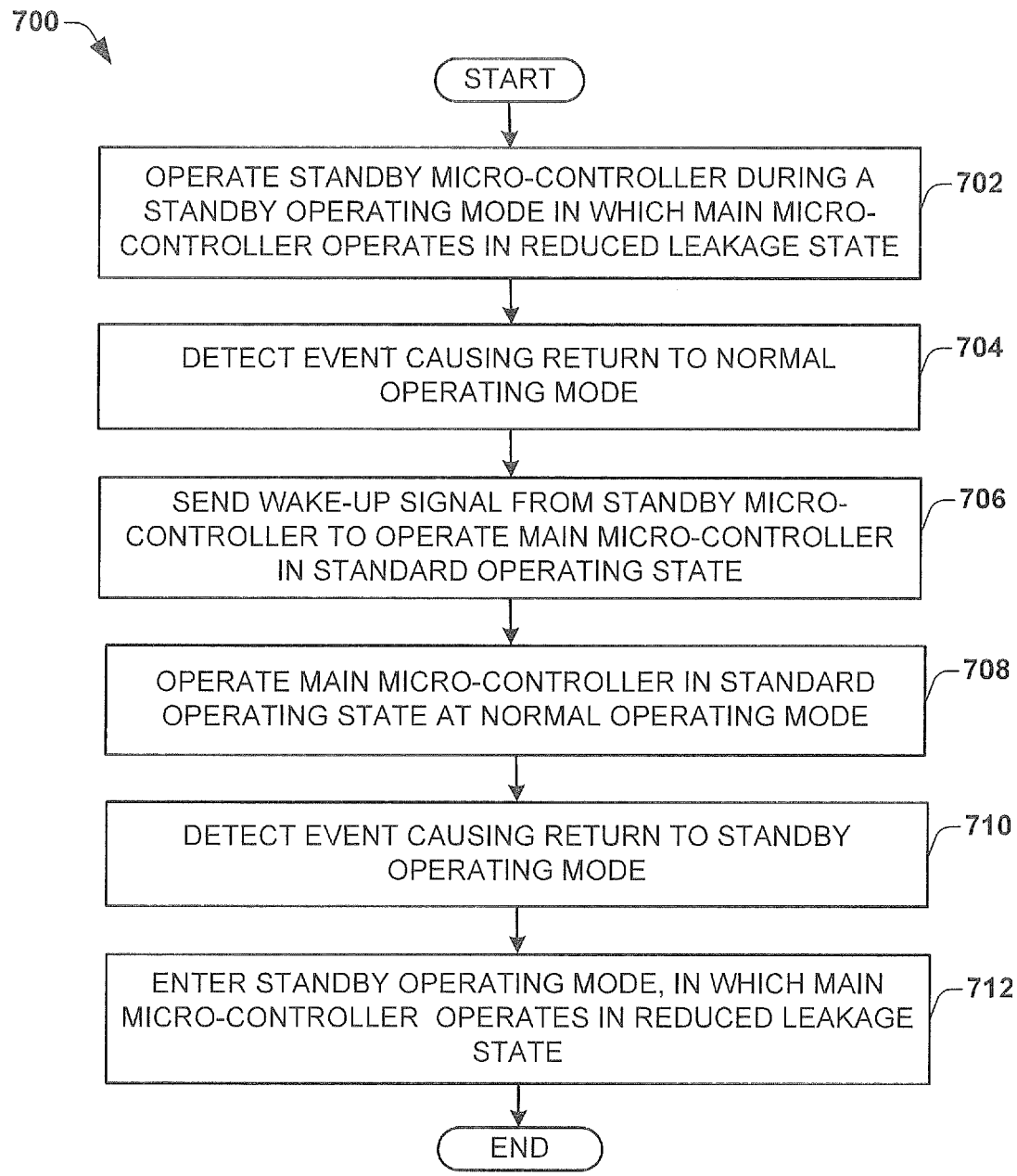
FIG. 7 illustrates a flow diagram of a method for operating a micro-controller unit.

FIG. 7 illustrates a flow diagram of a method 700 for operating a micro-controller unit. While the methods provided herein (e.g., methods 700 and 800) are illustrated and described below as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

Furthermore, the claimed subject matter may be implemented as a method, apparatus, or article of manufacture using standard programming and/or engineering techniques to produce software, firmware, hardware, or any combination thereof to control a computer to implement the disclosed subject matter (e.g., the circuits shown in FIG. 1, 2, etc., are non-limiting examples of circuits that may be used to implement the method of FIG. 7). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 702 a standby micro-controller is operated during a standby operating mode. During the standby operating mode the standby micro-controller is configured to perform processing of data while the main micro-controller is in a "reduced leakage state" negatively impacting the computational capabilities of the main micro-controller. The standby operating mode may be present if the micro-controller unit is in a low power standby operating mode, utilizing a subset of the full processing capabilities of a micro-controller unit comprising a main micro-controller and a standby micro-controller.

At 704 an event is detected that causes a return to a normal operating mode. The event is detected by the standby micro-controller. In one embodiment, the event may comprise an occurrence that utilizes an increased processing capacity (e.g., full operating capacity). For example, in an automobile, the event may comprise turning the automobile from an off state (e.g., parked) to an on state (e.g., driving).

At 706 a wake-up signal is sent by the standby micro-controller to change operation of the main micro-controller from a reduced leakage state to a standard operating state. Since the standby micro-controller is operational during the standby operating mode, it is able to determine when the system returns to a normal operating mode. When it determines that the system is to return to a normal operating mode it sends a wake-up signal to a power regulation apparatus that changes operation of the main micro-controller from a reduced leakage state (having impaired performance capabilities) to a standard operating state (having full performance capabilities). In one embodiment, the wake-up signal enables a voltage to be delivered from a power supply to a main micro-controller.

At 708 a main micro-controller is operated in a standard operating state during a normal operating mode. It will be appreciated that in the normal operating mode the standby micro-controller may remain on as a companion to the main micro-controller or it may be turned off. In one embodiment, upon receiving power, the main micro-controller is booted and the micro-controller unit is returned to a normal operating mode. In one embodiment, during the normal operating mode the main micro-controller is configured to perform processing of data at a second processing speed greater than the first processing speed. In another embodiment, during the normal operating mode the main micro-controller is configured to perform processing of data at a second processing speed substantially equal to the first processing speed.

At 710 an event is detected that causes a return to a standby operating mode. The event may indicate a decreased in the needed processing capacity. For example, in an automobile, the event may comprise the automobile being turned from a driving state to a stopped state.

At 712 the main micro-controller enters a "reduced leakage state" and the micro-controller unit enters the standby operating mode.

Figure 8:
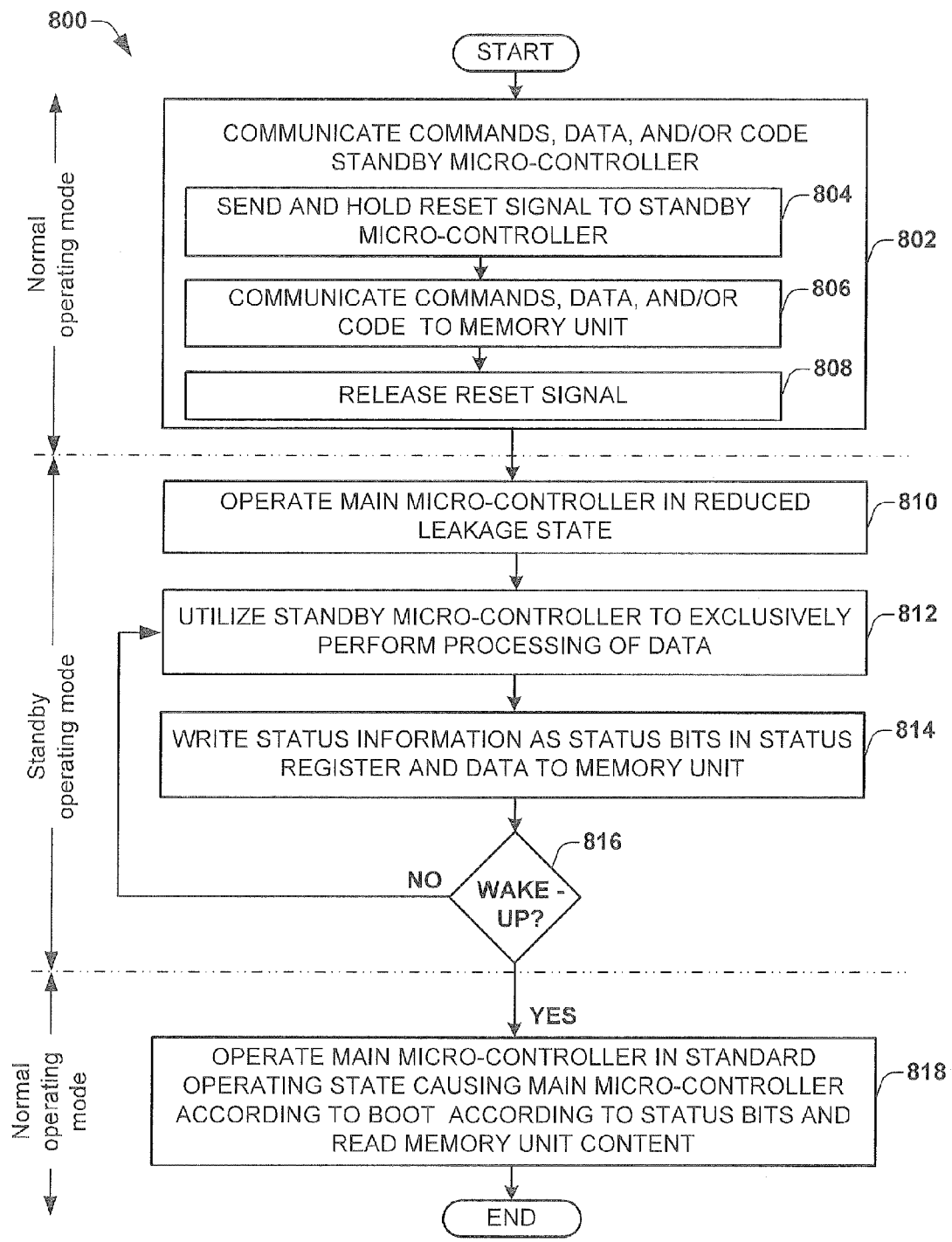
FIG. 8 illustrates a flow diagram of a method for communicating between micro-controllers during operation of a micro-controller unit.

FIG. 8 illustrates a flow diagram of a method 800 for communicating between micro-controllers during operation of a micro-controller unit.

At 802 commands, data, and/or code are communicated by a main micro-controller to a low-power standby micro-controller at 802. In one embodiment, the main micro-controller may communicate commands, code, and/or data to a memory unit (e.g., an SRAM memory) in the standby micro-controller by stopping (i.e., interrupting) operation of the standby micro-controller while the communication operation is being performed.

For example, the main micro-controller may be configured to send and hold a reset signal to a standby micro-controller to stop operation of the standby micro-controller (step 804). While the reset signal is being held, commands, code, and/or data are communicated to the main micro-controller to the memory unit by way of a communication interface (step 806). When the memory unit has received a well defined set of commands, code, and/or data from the main micro-controller, the reset signal is released (step 808) allowing the standby micro-controller to resume operation according to the new commands, code, and/or data that the main micro-controller has communicated to the memory array.

At 810 the micro-controller unit enters a standby operating mode and the main micro-controller enters a "reduced leakage state". In one embodiment, the main micro-controller enters a "reduced leakage by turning off power to the main micro-controller to eliminate the leakage current associated with the large number of transistors in the main micro-controller. In alternative embodiments, the main micro-controller enters a "reduced leakage by reducing the voltage supplied to the main micro-controller or by using well biasing techniques, for example.

At 812 the micro-controller unit operates using the standby micro-controller for processing of data. It will be appreciated that since the standby micro-controller has a non-zero processing power, the standby micro-controller may be operated during a wide range of applications using a relatively simple processing capabilities.

At 814, during operation in standby mode, the standby micro-controller writes data to the memory unit and status information to status register bits in the standby micro-controller.

At 816, the micro-controller unit transitions from a standby operating mode to a normal operating mode when the standby micro-controller sends a wake-up signal to a power supply. The wake-up signal indicates that the power supply is to operate the standby micro-controller in a standard operating state At 818 a main micro-controller is operated in a standard operating state and a normal operating mode is resumed. In one embodiment, upon being operated in a standard operating state, the main micro-controller boots according to the status bit(s) written by the standby controller and reads the content of the memory unit.

Although the invention has been illustrated and described with respect to one or more implementations, alterations and/or modifications may be made to the illustrated examples without departing from the spirit and scope of the appended claims.

For example, although the invention has been described in relation to micro-controller units, one of ordinary skill in the art will appreciate that the same method and structures may be used in regards to processors. For example, in a multi-core processor, the method and apparatus disclosed herein may be used to turn off one or more cores of a multi-core system to reduce power consumption and then to wake-up the cores to operate in a normal operating mode.

Moreover, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A micro-controller unit configured to operate in a normal operating mode and a standby operating mode, comprising:
   a standby micro-controller, comprising a micro-controller configured to perform data processing and a memory unit coupled to the micro-controller;
   a main micro-controller configured to process data during the normal operating mode, to send and hold a reset signal to the micro-controller to stop operation of the standby micro-controller, to communicate commands or code to the memory unit that control operation of the standby micro-controller during the standby operating mode, and to release the reset signal to resume operation of the micro-controller;
   a communication interface connected between the main micro-controller and the standby micro-controller and configured to enable communication between the main micro-controller and the standby micro-controller during the normal operating mode;
   a power supply coupled to the main micro-controller and the standby micro-controller by separate power supply paths and configured to selectively provide power to the main micro-controller based upon a wake-up signal; and
   wherein the standby micro-controller is configured to output the wake-up signal upon detection of a predetermined event.

2. The micro-controller unit of claim 1, wherein the standby operating mode is achieved by selectively providing bias voltages to one or more wells of semiconductor devices within the main micro-controller to reduce leakage currents of the semiconductor devices.

3. The micro-controller unit of claim 1, wherein the standby operating mode is achieved by not providing power to the main micro-controller, thereby eliminating leakage currents of semiconductor devices within the main micro-controller.

4. The micro-controller unit of claim 1, wherein the standby operating mode is achieved by reducing a voltage provided to the main micro-controller, thereby reducing leakage currents of semiconductor devices within the main micro-controller.

5. The micro-controller unit of claim 1, wherein the standby micro-controller is configured to receive the commands, the code, or data from the main micro-controller, via the communication interface.

6. The micro-controller of claim 1, further comprising:
   an integrated chip package containing the main micro-controller, the standby micro-controller, and the power supply on a single silicon substrate,
   wherein the main micro-controller and the standby micro-controller share one or more input/output pins of the integrated chip package.

7. The micro-controller unit of claim 1, wherein during the standby operating mode, the main micro-controller is operated in a reduced leakage state having reduced computational capabilities and power is provided to the standby micro-controller, thereby reducing leakage currents associated with transistors in the main micro-controller, while retaining computational capabilities of the standby micro-controller.

8. The micro-controller unit of claim 1, further comprising:
   a switching element configured to selectively provide power to the main micro-controller based upon the wake up signal.

9. A micro-controller unit, comprising:
   a standby micro-controller comprising a micro-controller configured to perform data processing and a memory unit coupled to the micro-controller;
   a main micro-controller configured to interrupt operation of the micro-controller to communicate commands or code that control operation of the standby micro-controller during standby operating mode to the memory unit, which is configured to store the commands or the code, by: sending and holding a reset signal to the micro-controller to stop operation of the standby micro-controller, communicating commands or code to the memory unit, and releasing the reset signal to resume operation of the micro-controller; and
   a power supply selectively coupled to the main micro-controller and to the standby micro-controller by a power regulation apparatus comprising a power regulator configured to receive a wake-up signal from the standby micro-controller and based upon the wake-up signal to provide power to an input of the main micro-controller; and
   a power regulator configured to receive a wake-up signal from the standby micro-controller at an input of the power regulator and based upon the wake-up signal to selectively provide power to an input of the main micro-controller.

10. The micro-controller unit of claim 7,
    wherein the main micro-controller, the standby micro-controller, and the power supply are comprised within a single silicon substrate;

wherein the single silicon substrate is contained within a single integrated chip package, and wherein the main micro-controller and the standby micro-controller share one or more input/output pins of the single integrated chip package.

11. The micro-controller unit of claim 9, wherein the standby micro-controller further comprises a status register configured to store one or more status bits, indicative of an event causing the standby micro-controller to send the wake-up signal, which are read by the main micro-controller when the power supply is connected to the main micro-controller.

12. The micro-controller unit of claim 9, wherein the power supply comprises:

a first power supply configured to selectively provide power to the main micro-controller by way of a first power supply path; and a second power supply separate from the first power supply and configured to provide power to the standby micro-controller by way of a second power supply path.

13. The micro-controller unit of claim 9, wherein during a standby operating mode, the power regulation apparatus is configured to disconnect the power supply from the main micro-controller and connects the power supply to the standby micro-controller, so that the standby controller is enabled to send a wake-up signal to the power regulation apparatus that causes the micro-controller unit to enter a normal operating mode in which the power supply is connected to the main micro-controller.

14. A method for operating a micro-controller unit, comprising:

operating a standby micro-controller in a standby operating mode in which a main micro-controller operates in a reduced leakage state having impaired performance capabilities;

interrupting operation of the standby micro-controller, to communicate commands or code, from the main micro-controller to a memory unit in the standby micro-controller, which control operation of the standby micro-controller in the standby operating mode, by:

sending and holding a reset signal to the standby micro-controller to stop operation of the standby micro-controller;

communicating the commands or code to the memory unit; and releasing the reset signal to resume operation of the standby micro-controller;

detecting an occurrence of an event that indicates a return to normal operating mode;

sending a wake-up signal from the standby micro-controller to a power regulation apparatus configured to selectively provide power to an input of the main micro-controller in a standard operating state based upon the wake-up signal; and operating the main micro-controller in the standard operating state having full performance capabilities.

15. The method of claim 14, further comprising reading one or more status bits from a status register in the standby micro-controller indicative of an event causing a return to the normal operating mode.

* * * * *